US008453513B2

(12) United States Patent
Bigliati et al.

(10) Patent No.: US 8,453,513 B2
(45) Date of Patent: *Jun. 4, 2013

(54) PRESSURE-SENSOR DEVICE

(75) Inventors: Marco Bigliati, Borgo S. Martino (IT); Paolo Colombo, Alessandria (IT); Giorgio Martinengo, Casale Monferrato (IT); Daniel Verner Mueller, Oberrohrdorf (CH); Mauro Zorzetto, Casale Monferrato (IT)

(73) Assignee: Eltek S.p.A., Casale Monferrato (Alessandria) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/200,323

(22) Filed: Sep. 23, 2011

(65) Prior Publication Data

US 2012/0011937 A1 Jan. 19, 2012

Related U.S. Application Data

(63) Continuation of application No. 12/520,641, filed as application No. PCT/IB2007/004154 on Dec. 18, 2007, now Pat. No. 8,051,719.

(30) Foreign Application Priority Data

Dec. 20, 2006 (IT) .............................. TO2006A0906

(51) Int. Cl.
*G01L 7/00* (2006.01)
(52) U.S. Cl.
USPC .......................................................... 73/756
(58) Field of Classification Search
USPC .................................................. 73/700–756
See application file for complete search history.

(56) References Cited

U.S. PATENT DOCUMENTS 4,168,630 A 9/1979 Shirouzu et al.
(Continued)

FOREIGN PATENT DOCUMENTS

WO    WO 98/31997    7/1998

OTHER PUBLICATIONS

International Search Report for PCT/IB2007/004154, mailed Jul. 2, 2009.
European Search Report issued Jun. 5, 2012 in connection with EP App No. 12156079.1.
European Search Report issued Jun. 5, 2012 in connection with EP App No. 12156084.1.

(Continued)

*Primary Examiner* — Andre Allen
(74) *Attorney, Agent, or Firm* — Nixon & Vanderhye P.C.

(57) ABSTRACT

A pressure-sensor device (1) comprises: —a pressure-sensitive component (9) having a body, defined in which is a blind cavity, and having a membrane portion (9*a*), operatively associated to which is a detection element (R); and —a connection structure (2), which has a duct in communication with the cavity of the pressure-sensitive component (9) and is to receive a fluid, a pressure of which is to be detected. The connection structure (2) comprises a supporting body (2*a*) of the pressure-sensitive component (9), which defines a respective passage (2*b*), and a compressible element (12, 18) that is designed to be in contact with the fluid and is configured for compensating possible variations of volume thereof. The compressible element (12, 18) is positioned at least in part within the cavity (11) of the pressure-sensitive component (9) and/or in a stretch of the passage (2*b*) of the supporting body (2*a*) that is close to the cavity (11) of the pressure-sensitive component (9).

20 Claims, 13 Drawing Sheets

U.S. PATENT DOCUMENTS

| | | |
|---|---|---|
| 5,186,055 A | 2/1993 | Kovacich et al. |
| 5,257,546 A | 11/1993 | Tobita et al. |
| 5,792,958 A | 8/1998 | Speldrich |
| 2003/0140703 A1 | 7/2003 | Weigl |
| 2011/0174080 A1 * | 7/2011 | Zorzetto et al. ............... 73/756 |

OTHER PUBLICATIONS

European Search Report issued Jun. 8, 2012 in connection with EP App No. 12156088.2.

* cited by examiner

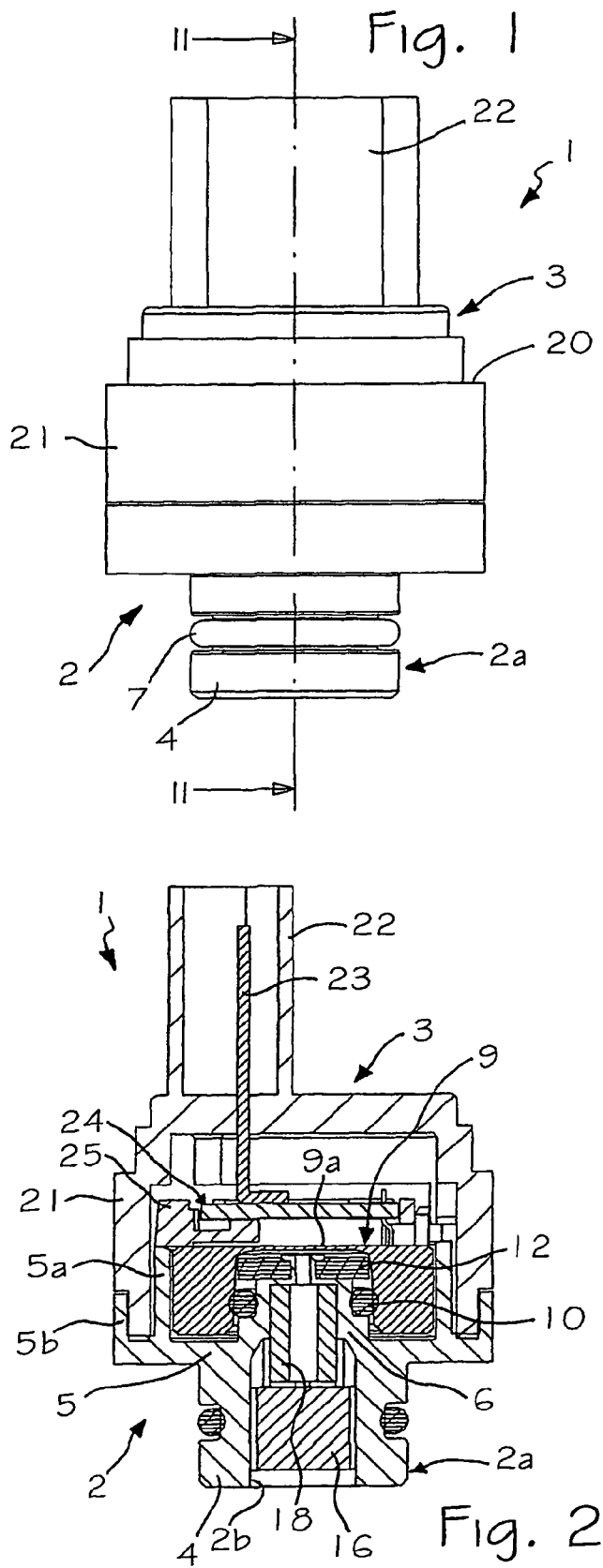
Fig. 1
Fig. 2
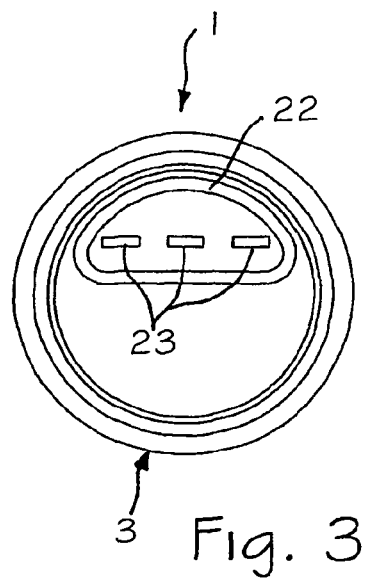
Fig. 3

Fig. 6
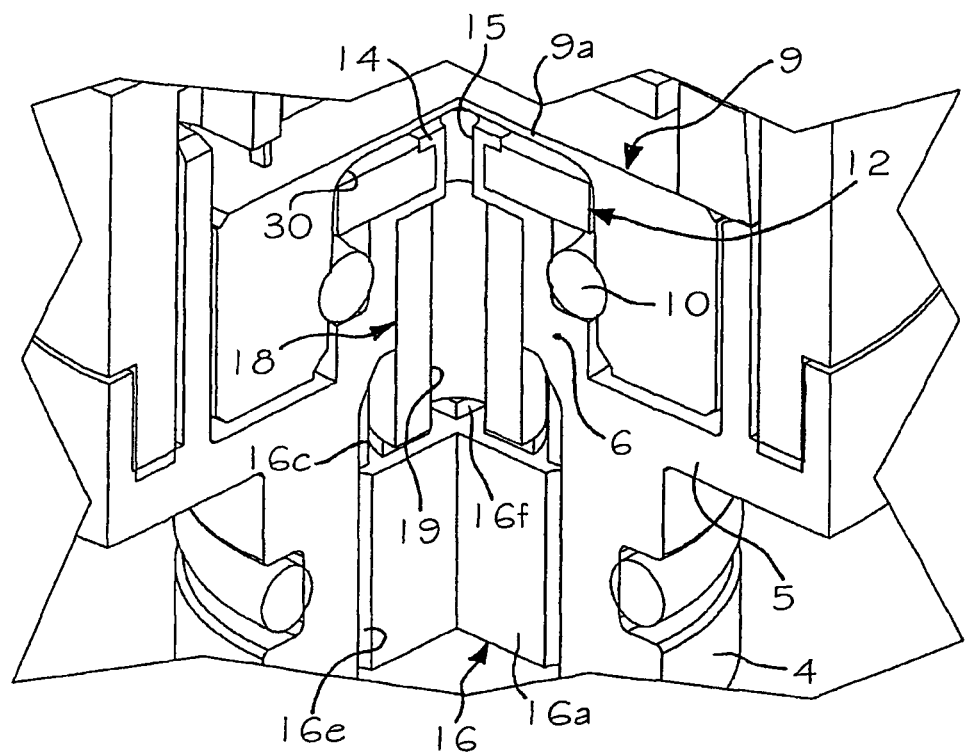
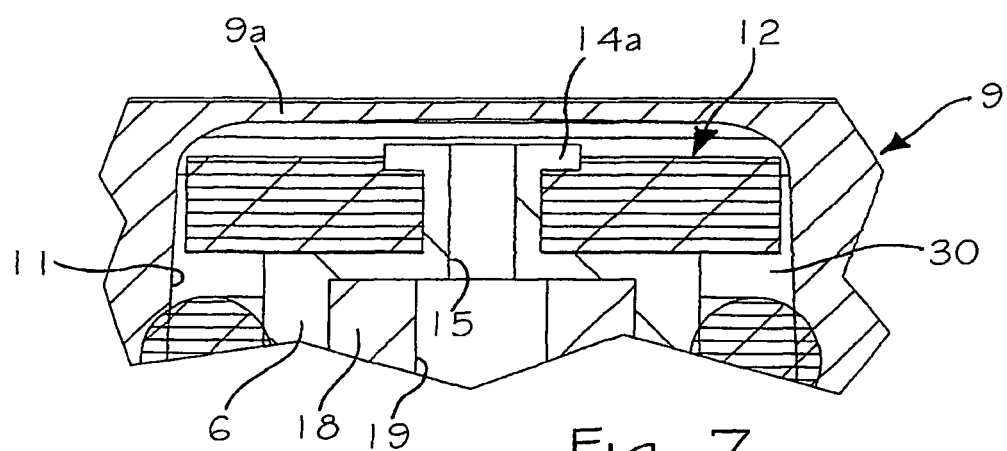
Fig. 7

Fig. 11
Fig. 12
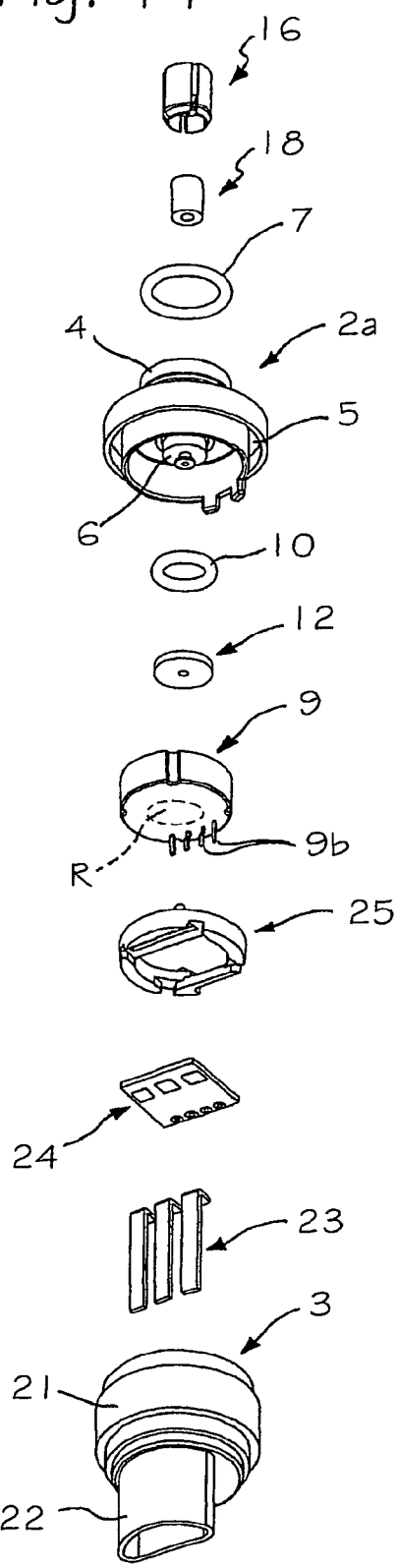
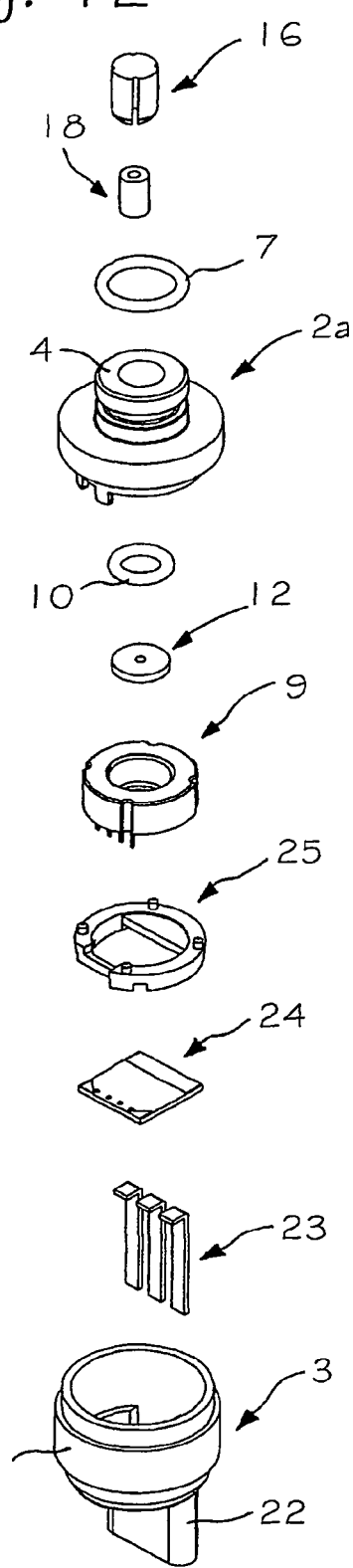

Fig. 19
Fig. 20
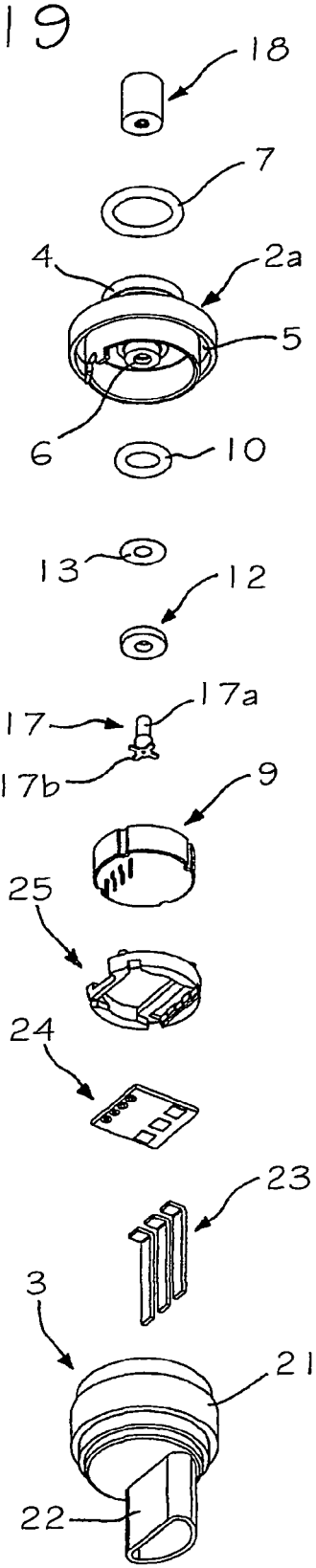
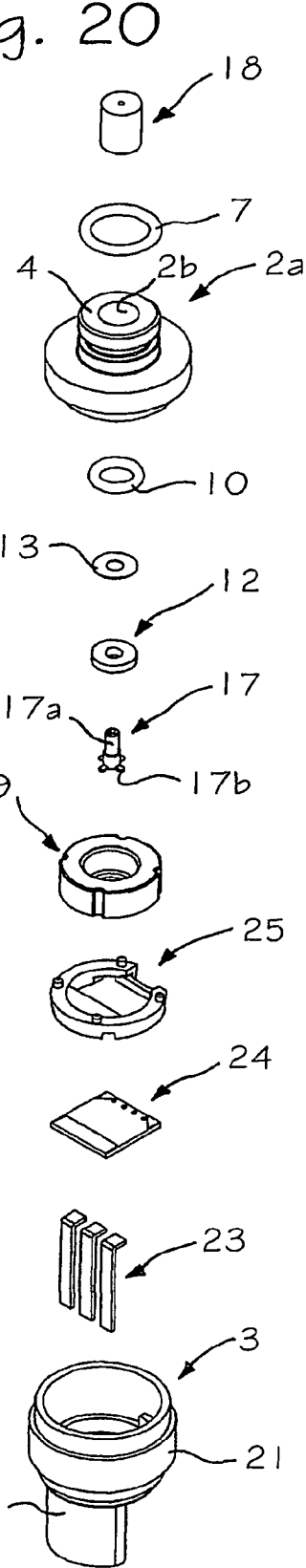

PRESSURE-SENSOR DEVICE

This application is a continuation of U.S. patent application Ser. No. 12/520,641 filed Oct. 6, 2009 now U.S. Pat. No. 8,051,719, which is the U.S. national phase of International Application No. PCT/IB2007/004154 filed 18 Dec. 2007 which designated the U.S. and claims priority to Italian Patent Application No. TO2006A000906 filed 20 Dec. 2006, the entire contents of each of which are hereby incorporated by reference.

FIELD OF THE INVENTION

The present invention relates to a pressure-sensor'device comprising:
- a pressure-sensitive component having a body, in particular of a monolithic type, defined in which is a blind cavity with a bottom surface and a peripheral surface, said bottom surface belonging to a membrane portion of said body, to said membrane portion there being operatively associated a detection element; and
- a connection structure having a duct in communication with said cavity, that is designed to receive a fluid a pressure of which is to be detected, said structure comprising:
  - a body for supporting the pressure-sensitive component, defining a respective passage; and
  - at least one compressible element that is designed to be in contact with said fluid and is configured for compensating possible variations of volume thereof.

DESCRIPTION OF THE PRIOR ART

In known devices of the type referred to, the fluid being measured is delivered, via the aforesaid duct, to the cavity of the body of the sensitive component in such a way as to cause bending of the membrane portion. The amount of said bending, which is a function of the pressure of the fluid, is measured via the detection element, the output signal of which is representative of the pressure value. The body of the pressure-sensitive component is usually made of silicon, and the detection element provided on the membrane portion is usually of a piezoresistive type.

In certain applications, a part of the fluid undergoing measurement of pressure can accumulate in contact with, or inside, delicate components of the sensor device, and in particular the pressure-sensitive component. In the case of low ambient temperature, the accumulated fluid can freeze, with a consequent increase in volume, which subjects the aforesaid delicate component or components of the device to mechanical stress, with the risk of causing failure or damage thereof.

Certain known sensor devices are provided with means for reducing the negative effects of possible dynamic variations of the pressure of the fluid present in the hydraulic circuit to which the device is connected, i.e., variations of the type commonly known as "pressure peaks" or "water hammering".

In some known devices, the aforesaid means are embodied by narrowing the sections of passage of the fluid towards the membrane portion of the sensitive component. In other cases, instead, combined with the sensor device is a compensation insert, also referred to as "plenum", made of an elastic or compressible material, the deformation of which is designed to compensate the aforesaid pressure peaks or increases. In these latter solutions, the insert is typically mounted in a position relatively distant from the membrane portion of the body of the sensitive component, on which the fluid to be measured operates. This position is chosen in view of the fact that the variations of pressure of a liquid can be usually offset in any point of the hydraulic circuit on which the sensor is mounted; said possible installation at a distance from the sensor typically favours the use of independent inserts or plenum devices of large dimensions. In the case of such a remote or distant installation from the sensor device, the possible increase in volume of the fluid due to freezing is not necessarily compensated for by the deformation or compression of the aforesaid insert. It should be considered in fact that a frozen fluid is an element in the solid state, and the forces, or thrusts, or stresses, are at times exerted in a non-uniform way, for example only in some points or only in some directions, which is a condition completely different from that of an expansion or variation of pressure of a fluid, which propagates throughout the hydraulic circuit, thus enabling attenuation by a compensation insert mounted even very distant from the pressure-sensitive component.

AIM OF THE INVENTION

The present invention proposes providing a pressure-sensor device designed to overcome the drawbacks referred to previously, in which the risks of damage due to possible freezing of the fluid undergoing detection of pressure are further reduced. A further purpose of the invention is to provide a pressure-sensor device designed to function also at low temperatures with fluids or liquids that are liable to freeze, in particular fluids, solutions or compounds comprising at least in part water. A further purpose of the invention is to provide a device of the type referred to that is simple and inexpensive to produce, but with reliable and precise operation.

SUMMARY OF THE INVENTION

The above and other purposes still are achieved, according to the present invention, by a pressure-sensor device having the characteristics specified in the annexed claims. The claims form an integral part of the technical teaching provided in relation to the invention.

BRIEF DESCRIPTION OF THE DRAWINGS

Further purposes, characteristics, and advantages of the present invention will emerge clearly from the ensuing detailed description and from the annexed plates of drawings, which are provided purely by way of explanatory and non-limiting example and in which:

FIG. 1 is a side elevation of a pressure-sensor device according to the invention;

FIG. 2 is a cross-sectional view according to the line II-II of FIG. 1;

FIG. 3 is a top plan view of the device of FIG. 1;

FIG. 6 is a detail at a larger scale of FIG. 5;

FIG. 7 is a first detail of FIG. 2, at a larger scale;

FIGS. 11 and 12 are exploded views of the device of FIG. 1, in two different orientations;

FIGS. 19 and 20 are exploded views of the device of FIG. 15, in two different orientations;

DETAILED DESCRIPTION OF THE INVENTION

Figure 4:
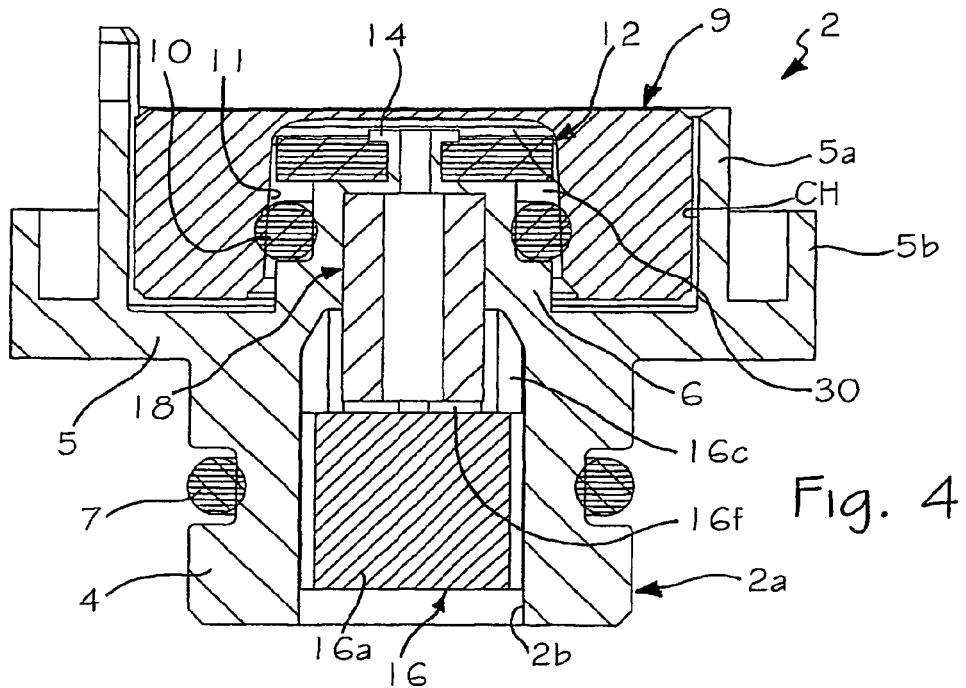
FIG. 4 is a cross-sectional view of a part of the device of FIG. 2, at a larger scale.

By way of non-limiting example, it is assumed here that the sensor device according to the invention is to be used in combination with systems for the control of nitrogen-oxide ($No_x$) emissions, particularly for vehicles with internal-combustion engines. As may be noted, operation of said systems presupposes the use of reagents such as ammoniac in aqueous solution or else urea, the pressure of injection of which is to be controlled with precision, via sensor devices of the type previously referred to.

With reference to FIGS. 1 to 3, designated as a whole by 1 is the pressure-sensor device forming the subject of the invention, in the structure of which there can be identified two main parts, designated by 2 and 3: the part 2 basically performs functions of support and hydraulic connection, whilst the part 3 basically performs functions of lid and of electrical connection or connector. The bodies of the two parts 2 and 3 are coupled together, preferably in a sealed way, also for forming a casing of internal components of the device 1.

The main body of the part 2, designated by 2a, is preferably made of a relatively rigid material, such as for example a thermoplastic material or a metal material, and is traversed axially by a cavity or passage designated as a whole by 2b. As may be seen also in FIG. 4, identified in the body 2a are: a connection portion 4, an intermediate coupling portion 5 and a terminal portion 6. The connection portion 4, which is generally cylindrical, externally has a seat for a radial sealing means 7, represented preferably by an O-ring. Said portion 4, which forms an inlet of the device, is designed to be connected to a hydraulic circuit (not represented), in which the fluid whose pressure is to be detected is located. The intermediate portion 5 comprises a flange-shaped wall, which extends radially towards the outside from the top of the connection portion 4. Rising from the aforesaid flange-shaped wall are an outer wall 5a and an inner wall 5b, having an annular configuration and being substantially coaxial with respect to one another. The wall 5a, which is higher than the wall 5b, delimits a cavity or chamber—designated by CH in FIGS. 4 and 13—located in which is a pressure-sensitive component, designated as a whole by 9; preferably, the chamber CH houses completely, or in any case a prevalent part of, the sensitive component 9.

The sensitive component 9 has a monolithic body, made, for example, of ceramic, or else plastic material, or else alumina, and is preferably cylindrical in shape. With reference to FIGS. 11-14, defined in the body of the element 9 is a blind axial cavity 11, open on a first end face of the body itself, said cavity being delimited by a bottom surface and a peripheral or circumferential surface, designated, respectively, by 11a and 11b only in FIG. 14. Between the bottom surface 11a of the cavity 11 and at least part of the second end face of the body of the sensitive component 9—designated by 11c only in FIG. 13—there is then defined a membrane portion, designated, in the various cross-sectional views, by the reference 9a, integrated in which is a detection element, represented schematically with a dashed line only in FIGS. 11 and 13, where it is designated by R. Preferably, the detection element R is made or fixed on the second face 11c, or on the side of the membrane 9a, external to the cavity 11. As per a known technique, the detection element R can be represented by a preferably thin-film piezo-resistive element or, more in general, by any electrical or electronic component that is able to generate a signal being representative of a deformation or bending of the membrane portion 9a. From FIG. 13 it may likewise be noted how, from the second end face 11c of the body of the sensitive component 9, there project terminals 9b, for electrical connection of the detection element R and/or of the corresponding electronic control circuit. In a version (not represented), also said control circuit can be provided or integrated at least in part on the second end face 11c, preferably on a portion of greater thickness of the monolithic body of the element 9, and in particular its annular part around the membrane portion 9a.

With reference once again to FIG. 4, rising from the central region of the flange-shaped wall 5, in a position substantially coaxial to the walls 5a and 5b and to the connection portion 4, is the aforesaid terminal portion 6, having a generally cylindrical tubular shape, formed on the outside of which is a shoulder or seat for positioning of a sealing means 10, represented preferably by an O-ring. Said O-ring 10 is prearranged for forming a radial seal between the outer surface of the terminal portion 6 and the peripheral surface 11b of the cavity 11.

The terminal portion 6 projects within the cavity 11 of the pressure-sensitive component 9 and mounted on its upper part a compensation element is mounted, designated by 12, having a predefined shape. This element 12 is made of a compressible material, so as to be able to offset or compensate possible increases of volume of the fluid undergoing detection, in the case of freezing thereof. In the embodiment currently deemed to be preferential, the body of the compensation element 12 is made of a spongy or foamed material, preferably of an impermeable type with closed-cell, such as for example EPDM or silicone. The body of the element 12 can in any case be made in other ways, for example of an elastic material provided with a compressible chamber or internal portion.

Figure 5:
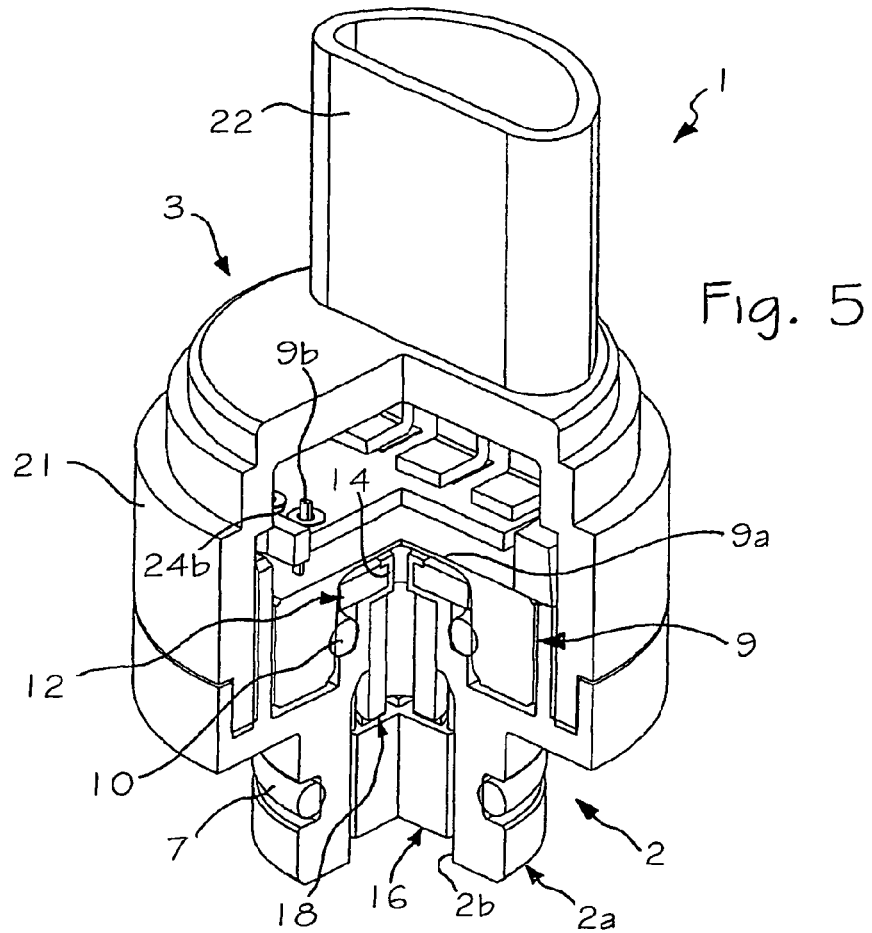
FIG. 5 is a partially sectioned perspective view of the device of FIG. 1.

The compressible or compensation element 12 has a generally cylindrical tubular shape, with a central through hole, fitted in which is a terminal projection 14 of the tubular portion 6. As may be seen, for example, in FIGS. 5-7, also the projection 14 is tubular, or is traversed by a respective part of the axial passage 2b of the body 2a. In particular, defined in the projection 14 is a respective portion 15 with a minimal passage section of the duct designed to deliver the fluid to the cavity 11 of the sensitive component 9. The upper end of the projection 14, designated by 14a only in FIG. 7, is substantially configured as a flange in order to keep the compensation element 12 in the operative position. It should be noted that the projection 14 could, however, be absent, and the compensation element 12 could be fixed in another way to the tubular portion 6, for example glued, welded, or over-moulded.

Figure 13:
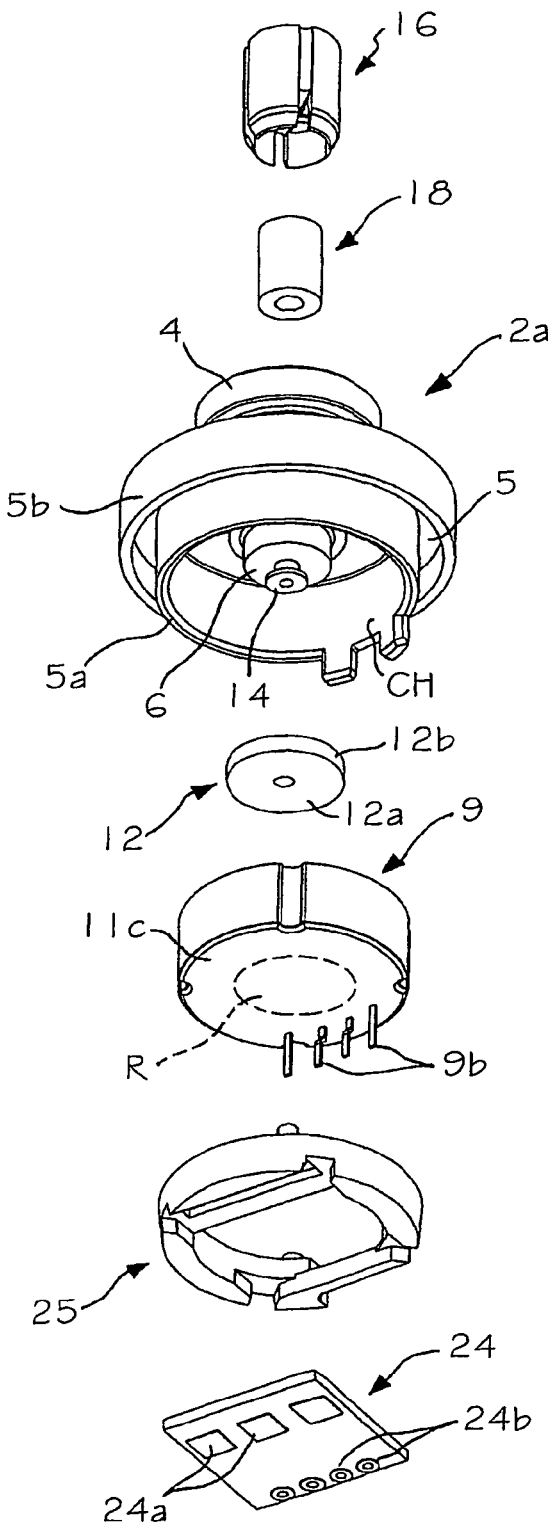
FIGS. 13 and 14 are perspective views of some components of FIGS. 11 and 12, at a larger scale.
Figure 14:
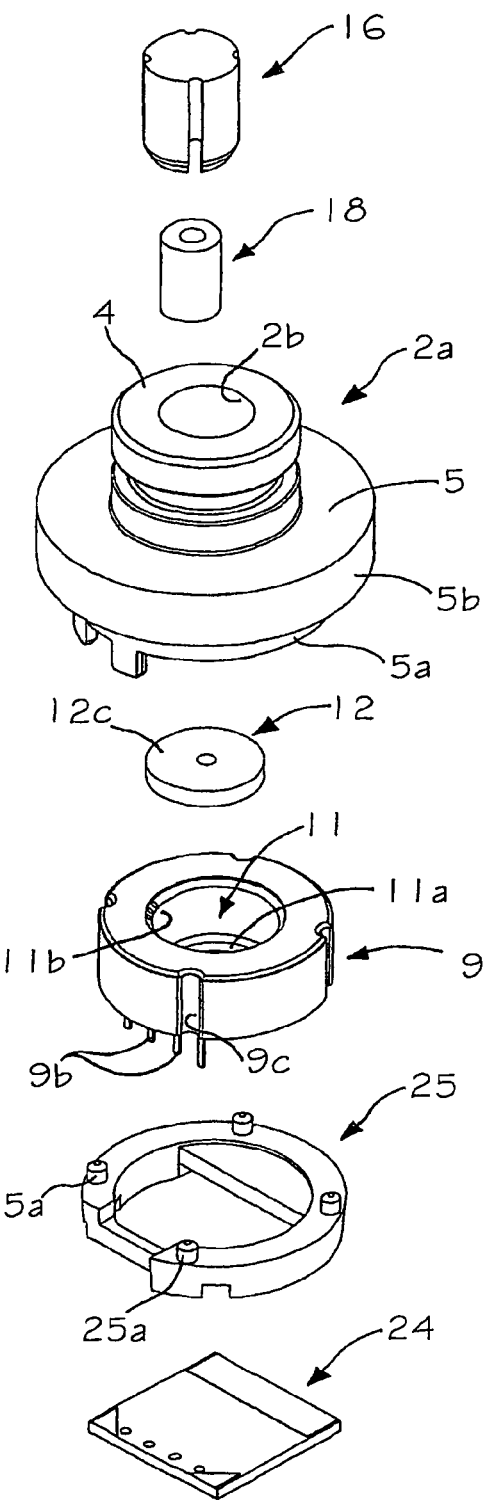
Figure 15:
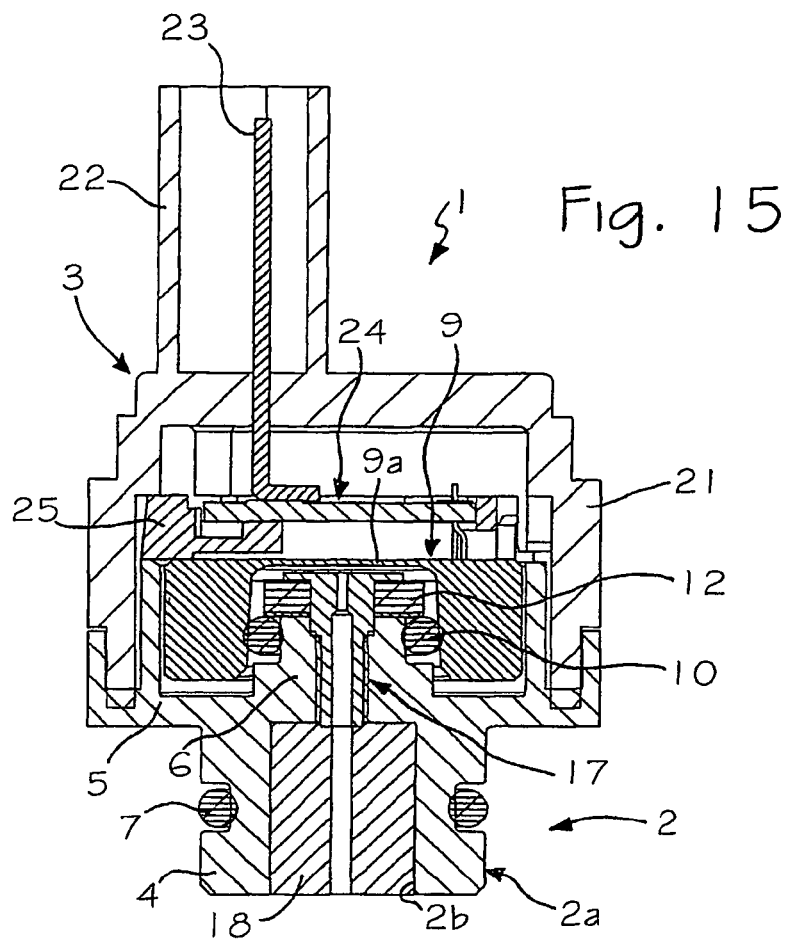
FIG. 15 is a cross-sectional view, similar to that of FIG. 2, of a first variant of the device according to the invention.

The upper surface of the compensation element 12—designated by 12a only in FIG. 13—faces the bottom surface 11a of the membrane 9a for a significant part thereof, preferably for the most part or at least over 50% of the entire surface 11a.

The distance between the surfaces 12a and 11a is preferably comprised between 0 and 5 mm, in particular between 0 and 0.5 mm. In the case of a solution that provides for a minimum distance, for example approximately 0.1 mm, between the surfaces 12a and 11a, there is the advantage of having little liquid undergoing freezing, or having a thin layer of liquid in contact with the membrane 9a, the percentage of expansion of which, following upon freezing, is negligible as compared to the capacity of bending of the membrane itself. In the case of a solution that provides, instead, for a contact between the surfaces 12a and 11a, for the compensation element 12 there is preferably envisaged the use of a material of lower hardness, or such as to enable the fluid to penetrate and distribute as a thin film over the entire bottom surface 11a, by virtue of the elasticity or yielding of the material, and/or prevent at the same time perturbation of the operation or sensitivity of the membrane. Preferably, also the peripheral or circumferential surface of the compensation element 12—designated by 12b only in FIG. 13—faces the peripheral surface 11b of the pressure-sensitive component 9. Said surface 12b is preferably at a distance from the surface 11b comprised between 0 and 2 mm, in particular between 0 and 0.5 mm. Preferably, the diameter of the compensation element 12 is comprised between 8 and 10 mm; the compensation element 12 can also have a diameter greater than the diameter of the peripheral surface 11b, in order to enable an installation with interference fit or radial seal between the compensation element 12 and the peripheral surface 11b. As may be seen in FIG. 4, at least part of the lower surface of the element 12 gives out into a chamber 30, described hereinafter (the lower surface of the element 12 is designated by 12c only in FIG. 14). In an operative configuration deemed preferable, the compensation element 12 has at least one outer surface (i.e., different from the cylindrical one that delimits the corresponding central through hole) exposed to the fluid; in the case provided by way of example in the figure, the aforesaid surfaces 12a, 12b, 12c are all at least partially exposed to the fluid.

Preferably, the device 1 comprises a second compensation element of a predefined shape, built in a way and having a general function similar to that of the element 12. Said second compensation element, designated by 18, is housed in a part of the passage 2b of the body 2a that extends between the portions 4-6 (see, for example, FIGS. 4-6). In particular, the upper portion of the element 18 is at least in part fitted in a respective part of the passage 2b of intermediate diameter, substantially similar to the diameter of the element 18, whilst the bottom portion of the element 18 is located within a part of the passage 2b of the body 2a of larger or maximum diameter.

The second compensation element 18 has an as a whole cylindrical shape, with an inner cavity 19 aligned axially to the cavity 15 of the projection 14, so as to define a respective part of the duct that carries the fluid being measured to the cavity 11 of the sensitive component 9; preferably, the cavity 19 has a section of passage larger than the axial cavity 15 of the projection 14.

Figure 8:
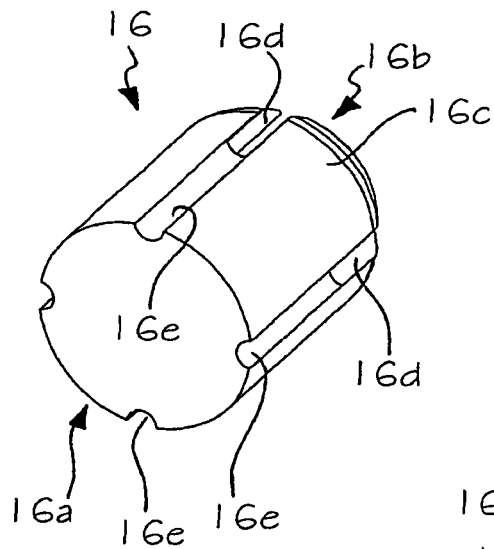
FIGS. 8 and 9 are perspective views of an insert of the device of FIG. 2, in two different orientations.
Figure 9:
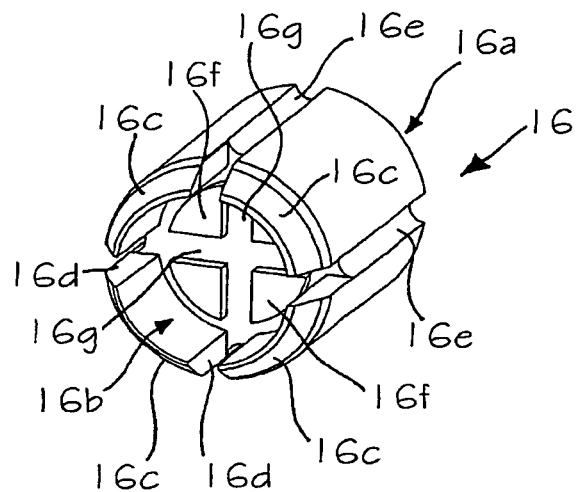

The compensation element 18 is kept within the passage 2b of the body 2a via a suitable positioning means, represented herein by an insert designated by 16. The insert 16, which is visible in detail in FIGS. 8 and 9, is constituted by a rigid body, for example made of thermoplastic material, or metallic or mouldable material, with a generally cylindrical shape, having a lower part 16a that is massive or full, and an upper hollow part 16b. The hollow part 16b is delimited peripherally by a number of walls or tabs 16c, which rise from the top of the full part 16a, where the slits of separation 16d between the tabs proceed in the same full part in the form of axial grooves, designated by 16e. As may be noted from FIG. 9, on the bottom of the hollow part 16b, or on the top of the full part 16a, there are provided shaped projections 16f, designed to define both resting surfaces for the compensation element 18 and channels 16g for passage of the fluid. In the case exemplified, at least two channels 16g are provided that criss-cross in the central region of the bottom of the hollow part 16b of the insert 16.

As may be seen, for example, in FIGS. 4 and 6, the insert 16 is mounted (for example, fitted with interference fit) within the part of the passage 2b of the body 2a having a maximum section of passage, and in such a way that housed in its hollow part is the lower part of the compensation element 18, with the latter resting on the projections 16f. The tabs 16c are then contained between the outer surface of the element 18 and the inner surface of the corresponding part of passage 2b of the body 2a, as may be seen also in FIG. 10.

As may be seen in FIGS. 1 and 2, the body of the part 3, for electrical connection, has a hollow lower region, delimited by a bottom wall 20 and a peripheral wall 21, the end of which is configured for coupling between the walls 5a and 5b of the body 2a of the part 2.

Rising from the bottom wall 20 is a tubular-body part 22, within which there extend terminals 23 for the electrical connection of the device 1. In the non-limiting example, the terminals 23 are mounted in such a way that the respective lower end faces the inside of the cavity of the part 3 in order to be in contact with first contact elements 24a (FIG. 13) belonging to an electrical circuit designated as a whole by 24. The circuit 24 likewise comprises second contact elements, herein configured as metal pads or bushings 24b (FIGS. 5 and 13), fitted and/or welded within which are the terminals 9b of the pressure-sensitive component 9.

Once again in FIGS. 3 and 11-14, designated by 25 is a member for supporting the aforesaid circuit 24, which has pills 25a designed to bear upon purposely provided perimetral seats (one of which is designated by 9c in FIG. 14) of the sensitive element 9, in particular for the purpose of providing a polarization or a precise mutual coupling. The pins 25a could have a substantially semicircular section.

In the assembled configuration of the device, as may be seen, for example, in FIG. 7, the cavity 11 of the pressure-sensitive component 9 is occupied by the terminal portion 6, provided at the top of which is the compensation element 12, which preferably occupies a significant portion of the cavity itself. As has been said, the element 12 is kept in position via the projection 14, and in particular its flange portion 14a. As has been said, said projection also defines the terminal portion 15 of the duct for delivery of the fluid, also including the portion 19 defined in the second compensation element 18. The presence of the seal or O-ring 10 delimits, within the cavity 11, a chamber 30 (FIGS. 4, 6 and 7), together with the exposed surfaces of the portion 6, the chamber of which is in fluid communication with the duct 15, 19 for delivery of the fluid.

Figure 10:
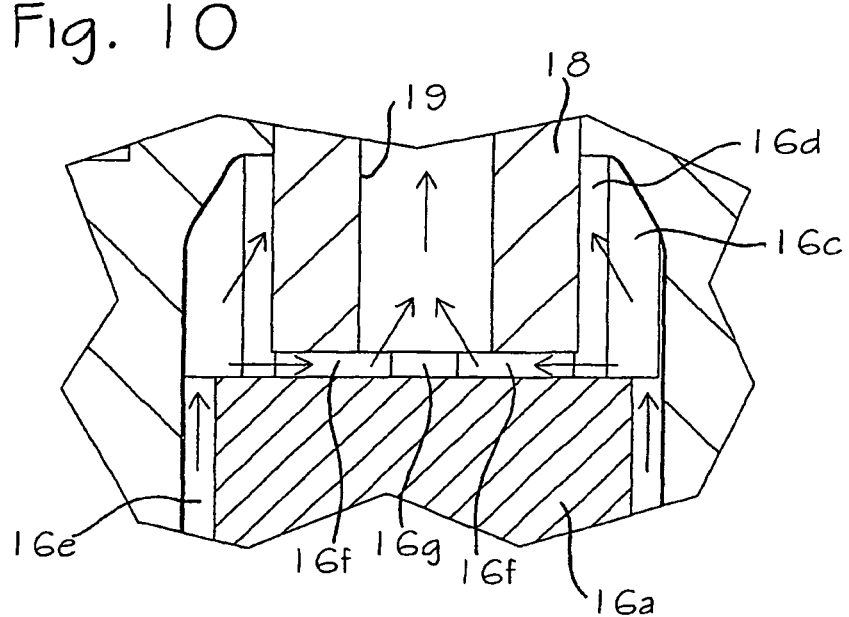
FIG. 10 is a second detail of FIG. 2, at a larger scale.

In FIG. 10, the fluid is represented schematically by the arrows. It should be considered that, in operative conditions, the fluid is undergoing only slight displacement, or it is in practically static conditions (consequently, also the ensuing references as regards the path followed by the fluid have the sole purpose of clarifying how the fluid itself can be in contact with or exert pressure on the membrane 9a of the pressure-sensitive component). In the condition of normal operation of the device 1, the fluid penetrates or flows in the passage 2b of the body 2a via the inlet defined by the lower end of the passage itself. By means of the axial grooves 16e formed in the lower part 16a of the insert 16, the fluid reaches the slits defined between the tabs 16c and then penetrates within the hollow part of the insert itself. The fluid can then occupy the channels defined between the projections 16f and thus reach the cavity 19 of the element 18. The fluid can in this way occupy also the cavity of the projection 14 and then the chamber 30 (FIG. 7); the pressure of the fluid then acts on the membrane portion 9a of the body of the sensitive component 9. Preferably, in conditions of normal operation of the fluid system, the pressure of the fluid is not sufficient to cause a significant compression of the compensation elements 12 and 18, thus enabling at least one further compression for compensation in the case of freezing of the fluid.

The consequent bending of the membrane portion 9a causes a corresponding deformation of the detection element R of FIG. 13, and hence a variation of the resistive characteristics thereof. In this way, a signal representing the pressure value of the fluid is generated to the terminals 9b of the element 9. Said signal, amplified and/or processed in a way in itself known by suitable electronic components of the circuit 24, reaches the terminals 23, which are electrically connected to a wiring (not represented) connected to a suitable control unit, for example an electronic control unit of a vehicle or a system for checking emissions of nitrogen oxides.

In particular circumstances, part of the fluid being measured can accumulate within the chamber 30 and within the duct of the fluid through the body 2a; in conditions of low ambient temperature, said accumulated fluid can freeze and thus increase in volume. The fact that the cavity 11 of the sensitive component 9 is occupied to a prevalent extent by the components referred to above has as a consequence that the useful volume in which the fluid can accumulate is reduced. The fact, moreover, that contained in said cavity 11 is practically the entire body of the compensation element 12 enables reduction to the minimum of the risks of stressing on the membrane portion 9a, precisely because the space—i.e., the chamber 30—in which the fluid can accumulate in the proximity of the membrane portion 9a is delimited to a substantial extent by surfaces of the compensation element 12, which can be compressed by the thrust of the fluid, which by freezing increases in volume.

According to a preferential characteristic, the provision of minimum sections of passage, determined by the grooves 16e, and/or the slits 16d, and/or the channels 16g (FIG. 10), has the function of determining preferential areas of start of freezing of the fluid within the corresponding duct. In practice, then, is in positions corresponding to the aforementioned minimum sections of passage 16e, 16d, 16g—basically creating capillary passages—that will tend to form initially a sort of "ice plug" in a position relatively distant from the membrane portion 9a, but in the immediate vicinity of the second compensation element 18. A similar function is performed, to a certain extent, also by the portion of duct 15 of small section, which is also in the immediate proximity of the compensation element 18 and/or the compensation element 12.

The aforesaid ice plugs in the pipes 16e, 16d, 16g, 15 can form in the first steps of freezing of the fluid, contributing to countering any expansion due to the subsequent more extensive freezing of the fluid, in particular of the fluid present in portion of duct of larger section. In practice, then, said plugs can constitute a sort of "spontaneous barrier" both to prevent any further inflow of fluid into the areas that risk failure and to counter the thrust in the direction of the membrane 9a of frozen masses of significant volume. In the case where freezing of the fluid propagates from the stretch 15 in the direction of the membrane portion 9a, it will be the element 12 that intervenes, in the sense of compensating for the increase in volume of the limited part of fluid present in the chamber 30.

Illustrated in FIGS. 15-20 is a first alternative embodiment of the device according to the invention. In said figures, the reference numbers of FIGS. 1-14 are used to designate elements that are technically equivalent to the ones already described above.

In this embodiment, the means for positioning the compensation element 12 is represented by a tubular insert made of rigid material, for example thermoplastic or metal material, designated as a whole by 17. As may be seen in FIGS. 16 and 19-20, the rigid insert 17 has a tubular section 17a, partially inserted (for example via screwing) in a respective part of the passage 2b formed in the body 2a, and in particular a part of passage that traverses the portions 5 and 6 axially. Fitted on the region of the tubular part 17a that is not inserted in the portion 6 is the compensation element 12. The upper end of the insert 17, designated by 17b, is configured for keeping the element 12 or preventing it from sliding out upwards, and is at least partially positioned in a corresponding seat or recess on the upper face of the compensation element 12. As may be seen in FIGS. 19-20, the end 17b of the insert 17 is substantially formed by a series of radial projections (the element 17 could in any case be of a different shape, for example without said projections).

Figure 16:
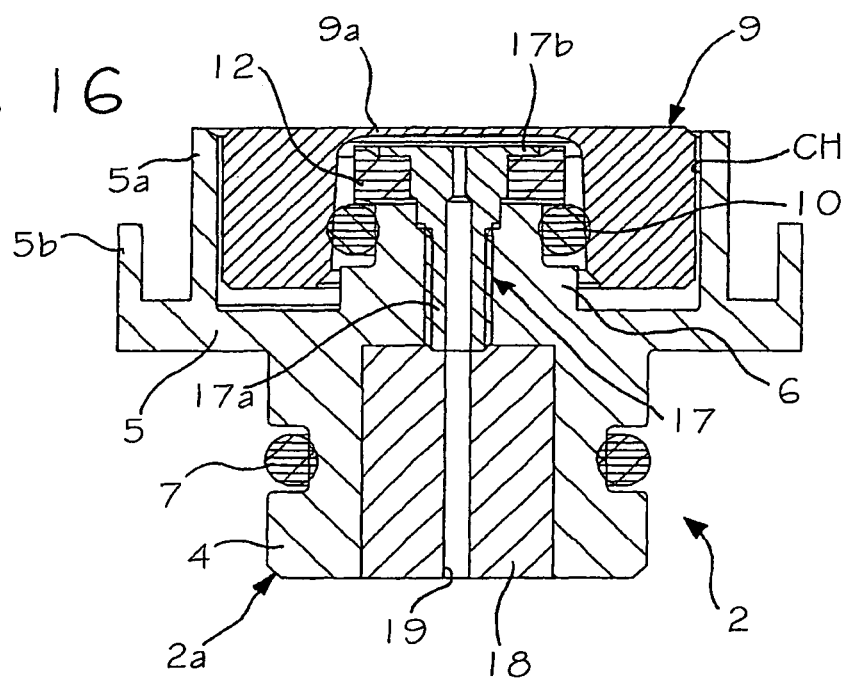
FIG. 16 is a cross-sectional view of a part of the device of FIG. 15, at a larger scale.
Figure 17:
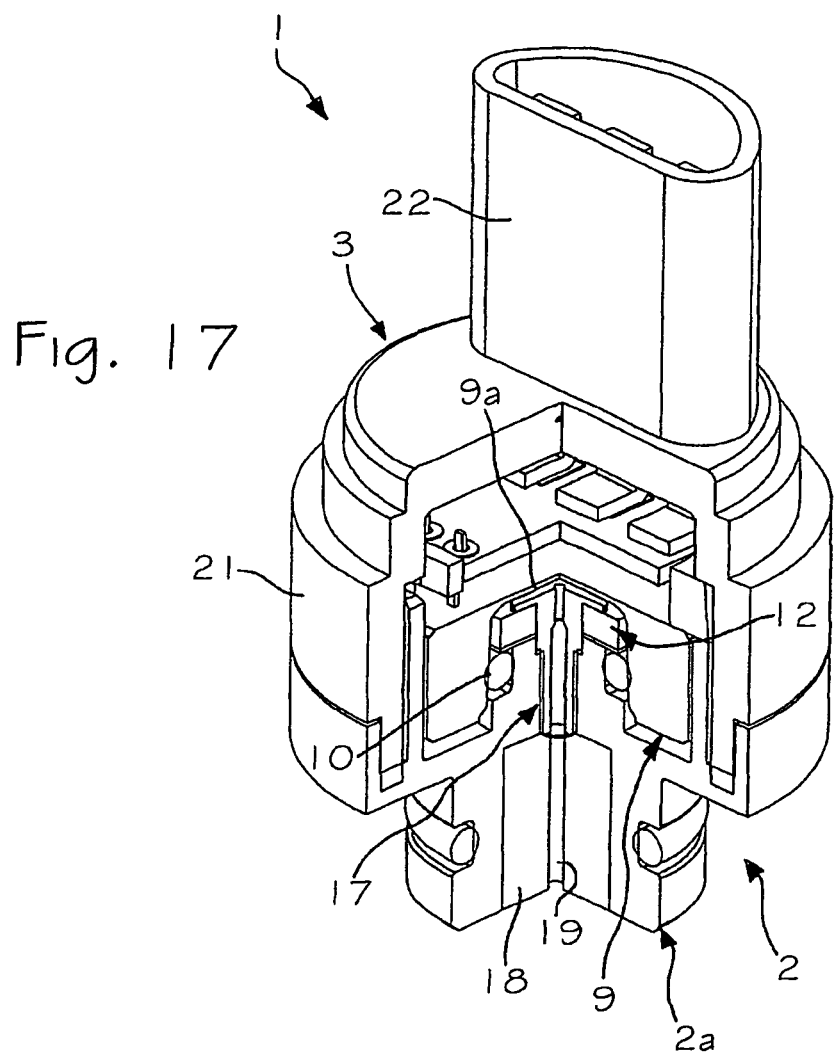
FIG. 17 is a partially sectioned perspective view of the device of FIG. 15.
Figure 18:
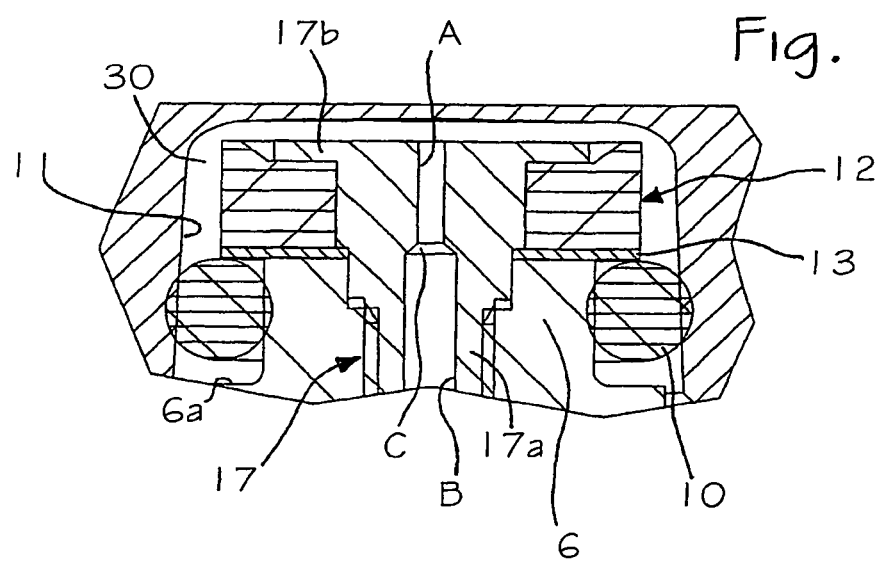
FIG. 18 is a detail of FIG. 16, at a larger scale.

As may be noted once again in FIGS. 16 and 18, defined in the insert 17 is a respective terminal portion of the duct that carries the fluid to the cavity of the sensitive component 9. In the case exemplified, said duct portion comprises two stretches, designated by A and B, having a different section of passage and being separated by an intermediate narrowed portion C, having a generally tapered shape. The stretch of duct A is preferably configured as capillary passage or duct. It should be noted that between the terminal portion 6 and the compensation element 12 a washer element 13 is preferably provided, which, together with the shoulder designated by 6a in FIG. 18, delimits a seat for the seal or O-ring 10.

Also in this embodiment, the device 1 comprises a second compensation element 18, housed in a respective part of the axial passage 2b defined in the connection portion 4 of the body 2a. The second compensation element 18 has an as a whole cylindrical shape, with a through cavity 19 aligned axially to the insert 17 so as to define a respective part of the duct that carries the fluid being measured to the chamber 30.

In the assembled configuration of the device, as may be seen for example in FIG. 18, the cavity 11 of the component 9 is to a fair extent occupied by the terminal portion 6, provided at the top of which is the compensation element 12, kept in position via the insert 17. As has been said, the insert 17 also defines the terminal stretch of the duct for the fluid, including also the stretch 19 defined in the second compensation element 18.

The general operation of the device of FIGS. 15-20 is basically similar to that of the device illustrated in FIGS. 1-14, both as regards the detection of the pressure value of the fluid and as regards the functions of compensation of possible increases in volume of the fluid due to freezing. It should in any case be pointed out that in this embodiment, and according to a further independently inventive aspect, the provision of just one stretch of capillary duct A has the function of predetermining—in effect—the area of start of freezing of the fluid. In practice then, it is in positions corresponding to the capillary stretch A that the ice plug tends to form initially.

The freezing of the fluid tends then to propagate or proceed towards the part of the duct B, C having a wider diameter, i.e., the part opposite to the membrane portion 9a. The presence of the second compensation element 18 further reduces the risks of damage to the device 1, since it enables compensation of the freezing of the fluid also on the opposite side with respect to the pressure-sensitive component.

Figure 21:
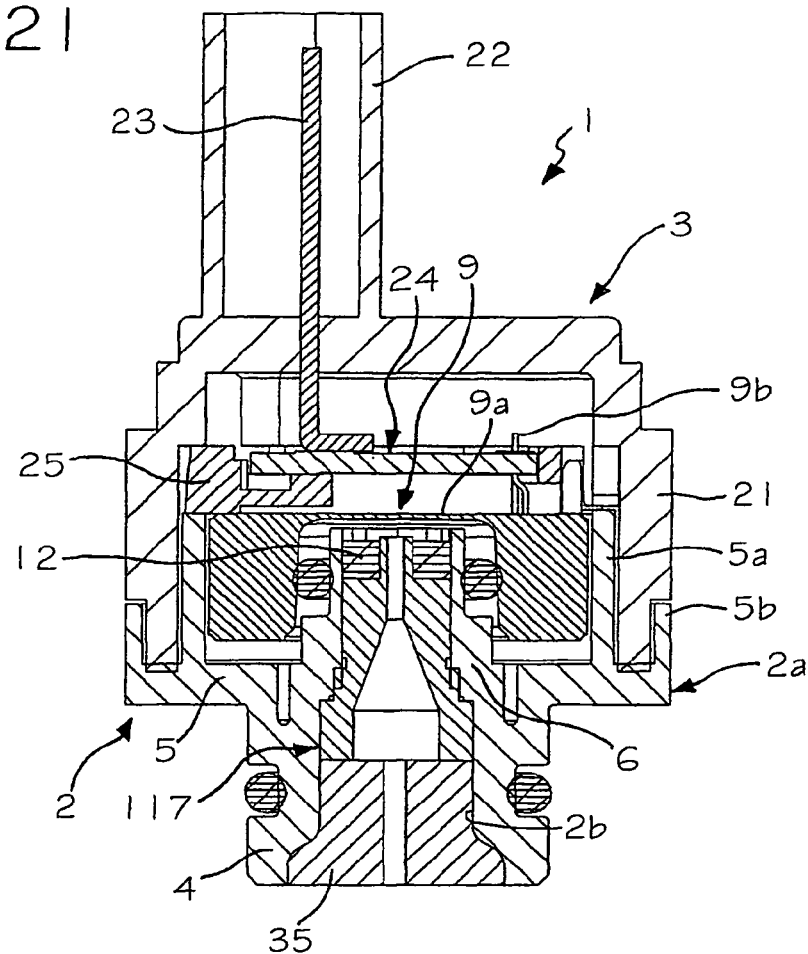
FIG. 21 is a cross-sectional view, similar to that of FIG. 2, of a second variant of the device according to the invention.
Figure 22:
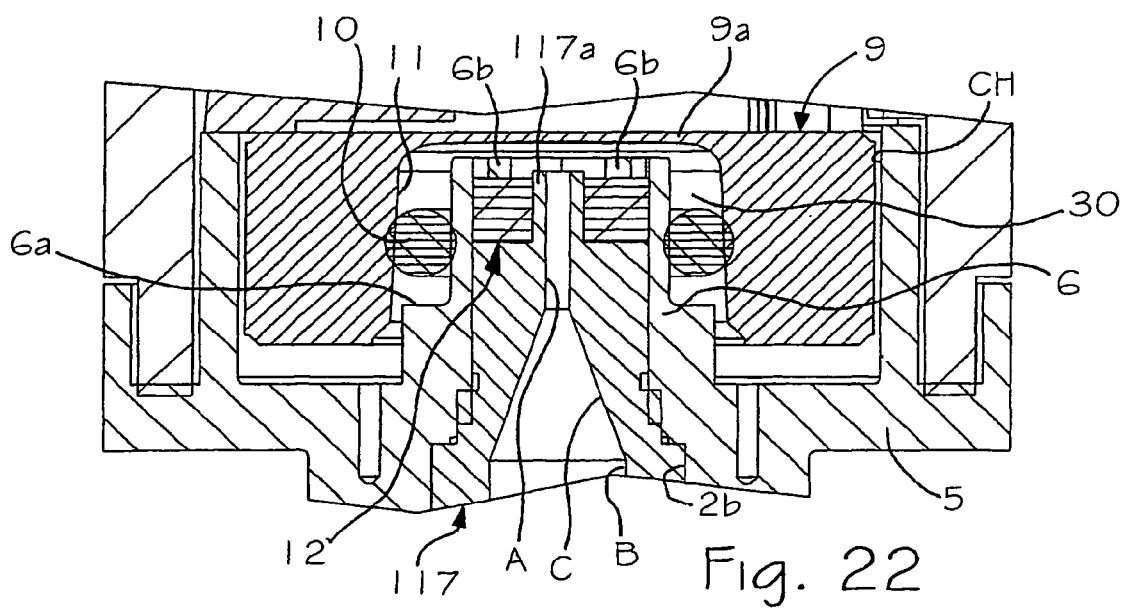
FIG. 22 is a detail of FIG. 21, at a larger scale.
Figure 23:
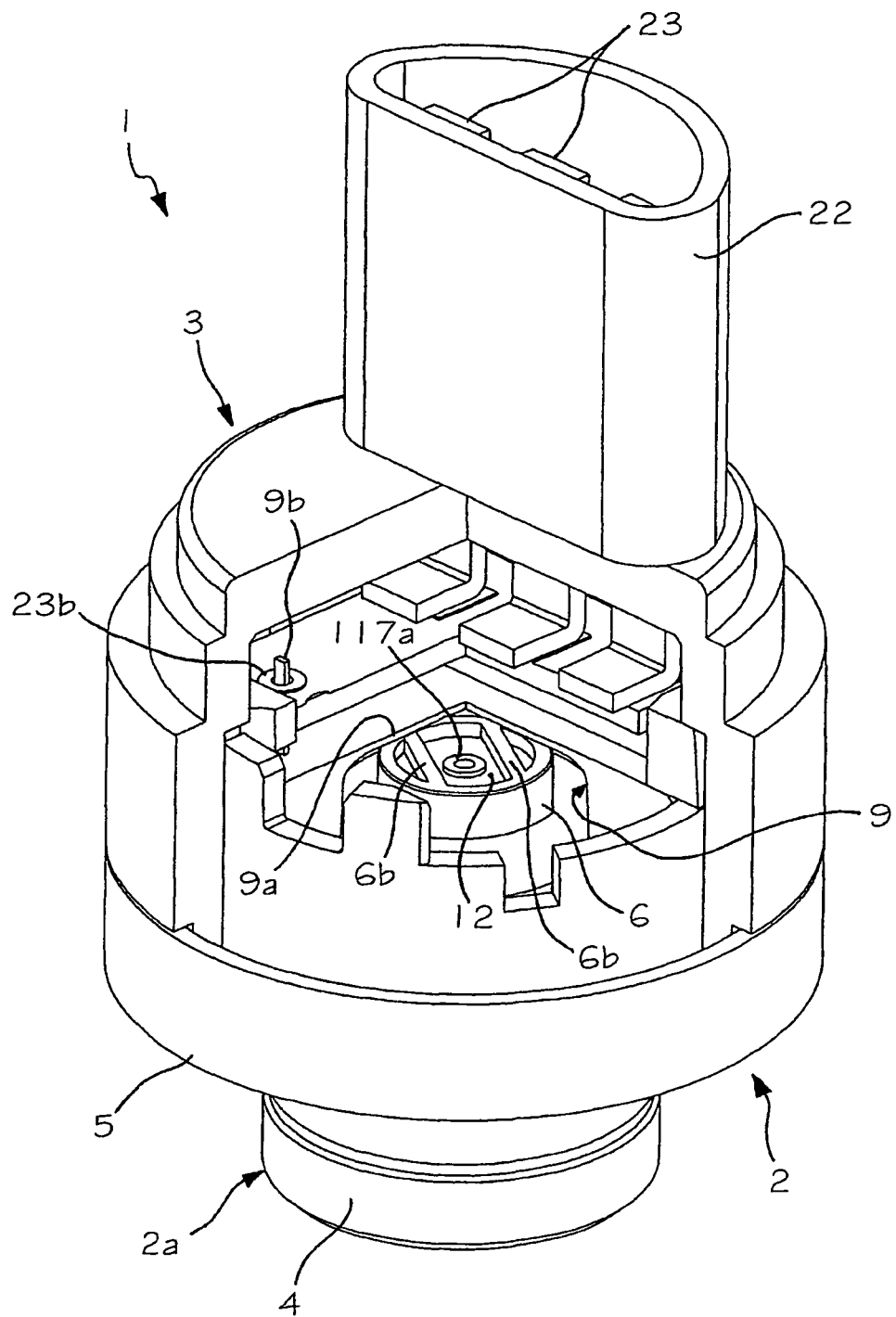
FIG. 23 is a partially sectioned perspective view of the device of FIG. 21, at a larger scale.

Illustrated in FIGS. 21-23 is a third embodiment of the device according to the invention. Also in said figures, the reference numbers of the previous figures are used to designate elements that are technically equivalent to the ones already described.

In the embodiment of the invention illustrated in FIGS. 21-23, the device 1 comprises just one compensation element 12 within the cavity 11 of the sensitive component 9. In this embodiment, the body 2a has an axial passage 2b of diameter larger than that of the previous embodiments, within which both a compensation element 12 and a rigid insert, designated by 117, are inserted.

The upper end of the terminal portion 6 is formed so as to prevent it from sliding out towards the outside of the compensation element 12. Provided for said purpose in the example of FIG. 23 are transverse diaphragms 6b, which delimit a plurality of axial passages. The insert 117 is fitted from beneath into the body 2a so that positioned between its top and the diaphragms 6b is the element 12.

In this embodiment, moreover, the insert 117 has a protruding upper projection 117a (FIGS. 22-23), traversed axially by a stretch of capillary duct A. The element 12, which is basically annular, surrounds said projection 117a. In the solution under examination, the washer 13 is not envisaged. In this embodiment, moreover, the insert 117 is kept in position via a bottom closing element, designated by 35, for example screwed or fitted in the stretch of passage 2b of the body 2a that extends in the connection portion 4.

Operation of the device according to the third embodiment is similar to that of the second embodiment; as has been said, however, in the case represented, the device does not comprise the compensation element 18.

FIGS. 24-27 are schematic cross-sectional illustrations of further possible embodiments of the invention. Also in said figures, the reference numbers of the previous figures are used to designate elements that are technically equivalent to the ones already described.

Figure 24:
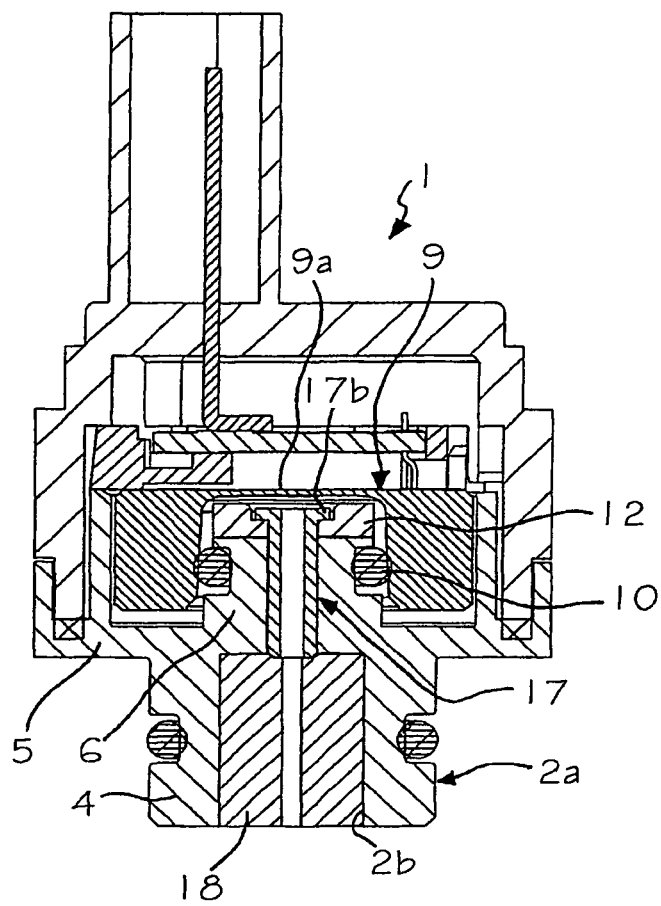
FIGS. 24, 25, 26 and 27 are cross-sectional views, similar to that of FIG. 2, of respective variants of the device according to the invention.

The fourth embodiment of FIG. 24 is conceptually similar to that of FIGS. 15-20, but with the difference that, in this case, the insert 17 has a top flange portion 17b that is basically circular and having a reduced diameter, and does not define a stretch of capillary duct, or it comprises only a duct that is substantially equivalent to the aforesaid stretch of duct B. In this embodiment, moreover, the washer 13 is not envisaged in so far as the seat for the seal or O-ring 10 is formed by a groove provided in the portion 6 of the body 2a.

Figure 25:
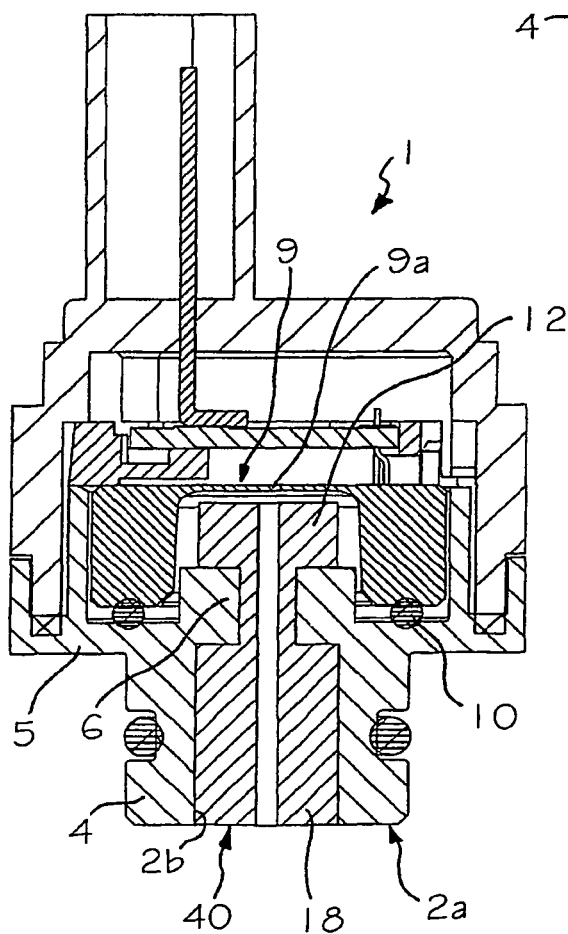
Figure 26:
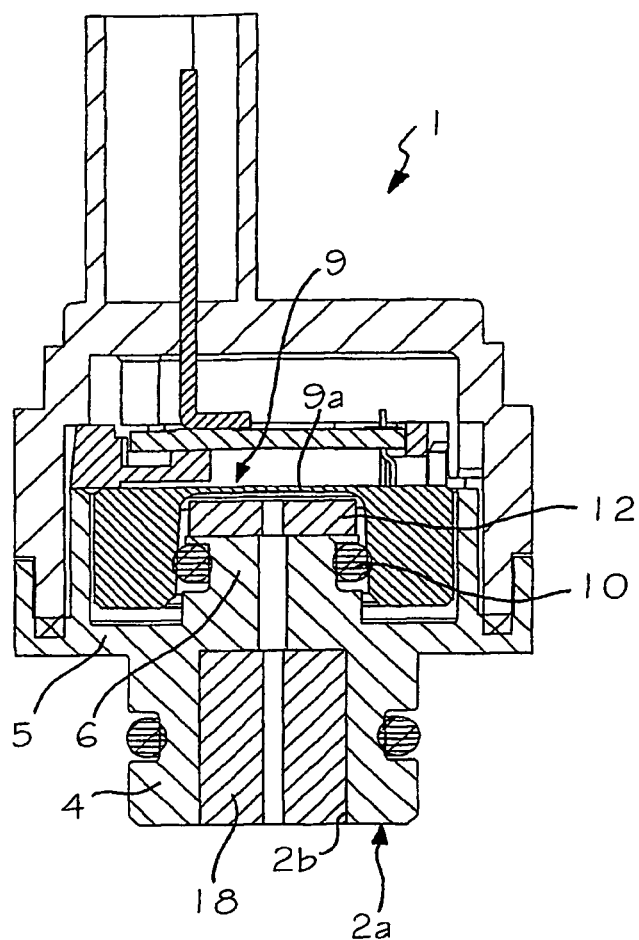

In the case of the fifth embodiment of FIG. 25, the two compensation elements 12 and 18 are configured in a single piece, designated as a whole by 40. As may be appreciated, provided between the two elements 12 and 18 is an intermediate portion of the piece 40, of restricted diameter, so as to provide a groove in which a corresponding region of the portion 6 of the body 2a engages. In this embodiment, moreover, the sealing means 10 operate between the face of the body of the sensitive component 9 onto which the cavity 11 opens, preferably a face that is at least in part plane, and the intermediate flange-shaped part 5 of the body 2a, also this part being provided with a face that is at least in part plane.

The duct for delivery of the fluid is entirely formed in the piece 40. Alternatively, the piece 40 could be provided with an intermediate part, which connects the two compensation elements 12 and 18 and does not form a stretch of the duct for the fluid, said intermediate part being preferably at least partially within the portion 6 of the body 2a.

The single piece 40 can be made separately and subsequently mounted on the body 2a, exploiting the elasticity of the material used. In a particularly advantageous embodiment, the piece 40 is obtained via moulding or over-moulding of material, preferably of a foamed type. Over-moulding is, for example, obtained directly on a part of the body 2a or of the casing of the device according to the invention, in particular at least partially inside of the portions 4, 6, or else on a corresponding insert.

The intermediate part of the single piece 40 inside the portion 6 of the body 2a can for example be made of moulding material, which fills purposely provided channels present in the body 2a, said channels extending between the areas for housing the two compensation elements 12 and 18. Said channels are exploited for passage of the moulding material, which subsequently hardens and forms the aforesaid intermediate part. The piece 40 could, however, be moulded in another way, also for the purpose of providing corresponding projections or elements for fixing to the body 2a of the device 1. For this purpose, the body 2a could advantageously be provided with seats, projections, or channels, designed for passage and/or fixing of the moulding or over-moulding material.

In general terms, the body 2a can be made of a first material, for example a thermoplastic material, and the piece 40 of a second material, for example EPDM or silicone. After obtaining the body 2a with the first material, this is inserted in a suitable mould, within which the second material that is to form the piece 40 is subsequently injected.

The mould can comprise, for example, at least one fixed part and at least one movable part, which are able to assume a working or closing position, and an opening position, according to modalities in themselves known. According to known techniques, the parts have respective impressions shaped for defining as a whole a common cavity within the mould, when they are closed in the working position. Said cavity is in part occupied by the body 2a and is provided—for receiving the material that is to form the piece 40, which as a whole has a shape designed to define, together with the axial passage 2b of the body 2a, the shape of said piece 40, with the corresponding axial duct. A possible sequence of moulding in order to obtain the body 2a with the over-moulded piece 40 could comprise for example the following steps:

i) insertion of the body 2a within a respective first part of mould, for example fixed;

ii) closing of the second part or parts of mould, for example movable, in order to delimit the aforesaid cavity;

iii) introduction of the material that is to form the piece 40 in an injection duct of the mould, which is in direct communication with the cavity;

iv) filling of the cavity and subsequent pause, in order to allow cooling and consequent solidification of the material that is to form the piece 40;

vi) opening of the mould and extraction of the semi-finished product thus obtained, i.e., of the body 2a including piece 40.

Obviously, even just one of the elements 12 and 18 could be over-moulded on the body 2a.

In the sixth embodiment (represented in FIG. 26), the cavity of the sensitive component 9 is occupied in part by the terminal portion 6 of the body 2a, on the top of which is positioned or fixed a compensation element 12, for example via gluing or welding or moulding. In the case of a simple positioning, the compensation element can be kept in position, possibly slightly compressed, between a surface of the terminal portion 6 and at least one surface of the sensitive component 9. Also envisaged in the sixth embodiment is the use of a second compensation element 18, which, however, could be absent. In this embodiment, the duct for the fluid is formed in part by the axial cavity of the compensation elements 12, 18 and in part by a stretch of the axial passage 2b of the body 2a.

Figure 27:
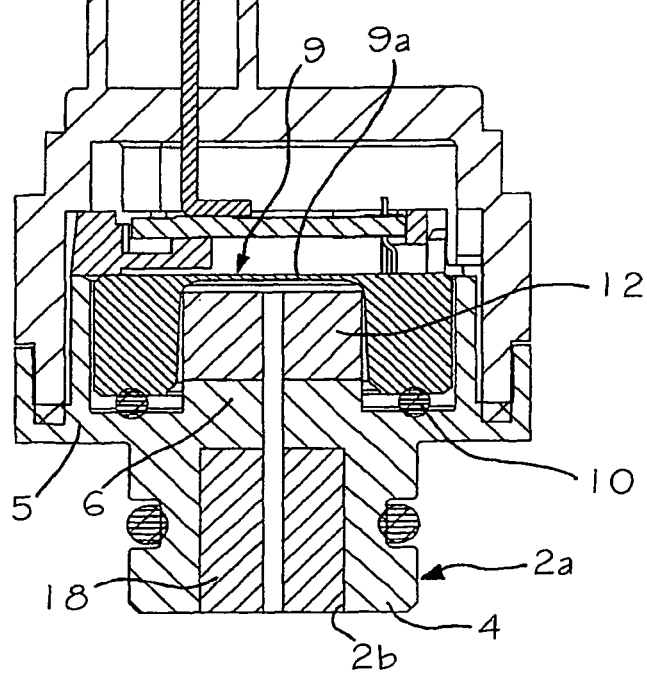

Finally, in the seventh embodiment, referred to in FIG. 27, the cavity of the sensitive component is instead prevalently occupied by a compensation element 12 with a thickness or height increased with respect to the previous embodiments. Said element 12 is positioned or fixed—for example via gluing—on the top of the portion 6, which in this case projects only to a minor extent within the aforesaid cavity 11; alternatively, the portion 6 could be outside the cavity 11 or even absent. Also in this embodiment, the duct for delivering the fluid is formed in part by the axial cavities of the compensation elements 12 and 18 and in part by an intermediate stretch of the axial passage 2b of the body 2a. In this embodiment, the sealing element 10 is mounted in a position similar to the one described with reference to the example of FIG. 25, i.e., between two substantially plane opposite faces of the sensitive element 9 and of the flange-shaped wall of the portion 5.

Practical tests conducted by the Applicant have enabled ascertainment of the fact that, as compared to the prior art, the sensor device forming the subject of the invention is decidedly less affected by risks of damage due to freezing of the fluid, whilst at the same time guaranteeing the necessary precision of measurement of pressure.

The presence of a compensation element within the cavity of the sensitive component reduces considerably the risks of damage to the corresponding membrane portion and/or to the detection element associated thereto. The fact that said cavity is occupied to a substantial extent by the compensation element and/or by portions of the structure that supports the sensitive component reduces the volume allowed for stagnation of fluid subject to possible freezing.

The presence of two compensation elements, in the case where both are envisaged, enables compensation to an increased extent of the possible freezing of the fluid in distinct regions of the device.

The presence of capillary passages, or in any case passages of reduced section, in the fluid duct, when they are envisaged, makes it possible to impose beforehand, with a relative precision, one or more regions in which the fluid will start to freeze, with the possibility of subsequently developing freezing in the parts of duct with wider section, or in a direction opposite to the membrane portion of the sensitive component.

The characteristics of the various embodiments described, also at the level of single characteristics, can be combined with one another in order to create devices that may even be different from the ones described and/or illustrated herein by way of non-limiting example.

It is clear that numerous variations may be made by a person skilled in the art to the device described by way of example herein, without thereby departing from the scope of the invention as defined in the annexed claims.

The compensation element 12 could be prearranged also in order to provide the functions of the sealing element previously designated by 10. In such a perspective, for example, the element 12 could comprise at least one deformable Peripheral part that performs functions of O-ring, of a diameter such as to be able to interfere decidedly with respect to the peripheral wall 11b of the pressure-sensitive component 9 and/or with parts of the body or casing of the device 1 and/or corresponding inserts.

As mentioned previously, the compensation element or elements could be made of silicone, of a foamed or non-foamed type, or else silicone mixed with air bubbles, for example poured and left to harden in a mould or appropriate seat. Also using said material, the compensation elements can be configured in a single piece, and/or made separately and/or moulded over the body 2a.

Also the inserts provided for the body 2a, for example the insert 17, can be moulded over the body itself, with modalities that are basically similar to the ones referred to above in relation to the over-moulding of the compensation element 12.

The invention claimed is:

1. A pressure-sensor device that comprises:
  a pressure-sensitive component having a body, defined in which is a blind cavity with a bottom surface and a peripheral surface, said bottom surface belonging to a membrane portion of said body, there being operatively associated to said membrane portion a detection element; and
  a connection structure having a duct in communication with said cavity, that is to receive a fluid, a pressure of which is to be detected, said connection structure comprising:
    a supporting body of the pressure-sensitive component, defining at least one respective passage; and
    a compressible element that is designed to be in contact with said fluid and is configured for compensating possible variations of volume thereof;
  wherein said compressible element is positioned at least in part within said blind cavity,
  and wherein
    said connection structure comprises a positioning member for positioning said compressible element, the positioning member being made of a single piece with said supporting body or else associated or fixed thereto;
    said positioning member has a respective tubular portion defining a terminal stretch of said duct; and
    said compressible element is housed or fixed at said tubular portion of the positioning member, with the tubular portion being at least partially surrounded by the compressible element.

2. The device according to claim 1, wherein a portion of said structure, through which said terminal stretch of said duct extends, projects in said blind cavity and occupies a prevalent part thereof, said portion of the connection structure including said compressible element and said positioning member.

3. The device according to claim 1, wherein said compressible element occupies a prevalent part of said blind cavity.

4. The device according to claim 1, wherein a tubular portion of said supporting body, with which said positioning member is made in a single piece or to which said positioning member is fixed, projects in said blind cavity and occupies at least one part thereof.

5. The device according to claim 1, wherein said compressible element is positioned completely within said blind cavity.

6. The device according to claim 1, wherein said compressible element has at least one of
  an upper surface that faces said bottom surface extensively, for at least approximately 50% of said bottom surface;
  an upper surface at a distance from said bottom surface that is comprised between 0 and 5 mm and a peripheral surface that faces said peripheral surface of the blind cavity at a distance thereof that is comprised between 0 and 2 mm;
  has a diameter equal to or greater than a diameter defined by said peripheral surface of the blind cavity.

7. The device according to claim 1, wherein said connection structure comprises a further compressible element, positioned in a stretch of the passage of the supporting body close to said blind cavity.

8. The device according to claim 1, wherein said duct has stretches having a different section of passage.

9. The device according to claim 8, wherein said duct has at least one stretch that is configured as a capillary passage.

10. The device according to claim 1, wherein said supporting body includes a tubular portion traversed by said passage and facing said blind cavity of the pressure sensitive component.

11. The device according to claim 10, further comprising radial sealing means, operating between said tubular portion and said peripheral wall of said blind cavity.

12. The device according to claim 1, wherein
at least one part of said positioning member is exposed to the fluid; or
said positioning member has a flange part resting on an end surface of said compressible element.

13. The device according to claim 6, including a further positioning member for said further compressible element, wherein said further positioning member is at least in part housed within said passage of the supporting body, and has at least one of
a hollow portion, housed within which is a respective portion of said further compressible element; and
at least one surface groove facing a surface of said passage of the supporting body for defining therewith a stretch of said duct.

14. The device according to claim 13, wherein
said hollow portion has a bottom defining resting projections for the further compressible element, or
said hollow portion is delimited by a series of tabs or walls that rise from a massive part; or
said further positioning member is inserted in a stretch of the passage of said supporting body, and said further compressible element has a respective axial passage that forms part of said duct.

15. The device according to claim 6, wherein
at least part of said duct is defined by said further compressible element; or
set between said compressible element and said further compressible element is a part of said supporting body including a stretch of the corresponding passage that forms also a stretch of said duct.

16. The device according to claim 1, further comprising at least one of
circuit means electrically connected to said pressure-sensitive component;
means for positioning circuit means electrically connected to said pressure-sensitive component;
a casing part connected to said supporting body;
electrical connection terminals carried by a casing part connected to said supporting body.

17. A pressure-sensor device that comprises:
a pressure-sensitive component having a body, defined in which is a blind cavity with a bottom surface and a peripheral surface, said bottom surface belonging to a membrane portion of said body, there being operatively associated to said membrane portion a detection element; and
a connection structure having a duct in communication with said blind cavity, that is to receive a fluid, a pressure of which is to be detected, said connection structure comprising:
a supporting body of the pressure-sensitive component, defining at least one respective passage; and
a compressible element that is designed to be in contact with said fluid and is configured for compensating possible variations of volume thereof, the compressible element having an axial through hole,
wherein said supporting body has an upper portion at which an upper end of said passage is defined,
and wherein said compressible element is positioned completely within said blind cavity, said compressible element resting on said upper portion of the supporting body such that the axial through hole thereof is axially aligned with the said upper end of the said passage of the supporting body, the said through hole thus forming with said passage said duct in communication with said blind cavity.

18. A pressure-sensor device that comprises:
a pressure-sensitive component having a body defined in which is a blind cavity with a bottom surface and a peripheral surface, said bottom surface belonging to a membrane portion of said body, there being operatively associated to said membrane portion a detection element; and
a connection structure having a duct in communication with said blind cavity, that is to receive a fluid, a pressure of which is to be detected, said structure comprising:
a supporting body of the pressure-sensitive component, defining at least one respective axial passage; and
a compressible element that is designed to be in contact with said fluid and configured for compensating possible variations of volume thereof, said compressible element having an axial through hole,
wherein said supporting body has an upper portion at which an upper end of said axial passage is defined,
wherein at least a top portion of the compressible element projects within said blind cavity,
and wherein said top portion of said compressible element that projects within said blind cavity is wider than said upper end of the axial passage.

19. A pressure-sensor device that comprises:
a pressure-sensitive component having a body, defined in which is a blind cavity with a bottom surface and a peripheral surface, said bottom surface belonging to a membrane portion of said body, there being operatively associated to said membrane portion a detection element; and
a connection structure having a duct in communication with said blind cavity, that is to receive a fluid, a pressure of which is to be detected, said connection structure comprising:
a supporting body of the pressure-sensitive component, defining at least one respective passage; and
a compressible element that is designed to be in contact with said fluid and configured for compensating possible variations of volume thereof, the compressible element having an axial through hole,
wherein said supporting body has a upper portion at which an upper end of said passage is defined,
wherein the compressible element includes a top portion and a lower portion, said lower portion of the compressible element being housed within said passage of the supporting body and said top portion of the compressible element projecting within said blind cavity, with said axial through hole of the compressible element that forms a terminal stretch of said duct,
and wherein the compressible element also includes an intermediate portion having a restricted diameter with respect to the top portion and the lower portion, for providing a groove in which a corresponding region of the supporting body engages.

20. The device according to claim 19, wherein
also said intermediate portion of the compressible element is housed within said passage of the supporting body and said top portion of the compressible element rests in part on a top surface of said upper portion of the supporting body, and
a portion of said connection structure, through which there extends said terminal stretch of said duct, projects in said blind cavity and occupies a prevalent part thereof, said portion of the connection structure including said top portion of the compressible element.

\* \* \* \* \*